June 26, 1962 R. O. PETERSON 3,040,608
RECIPROCATING SURFACE-FINISHING MECHANISM AND METHOD
Filed March 3, 1955 8 Sheets-Sheet 1

INVENTOR.
RUBEN O. PETERSON
BY
Oberlin & Limbach
ATTORNEYS.

June 26, 1962 R. O. PETERSON 3,040,608
RECIPROCATING SURFACE-FINISHING MECHANISM AND METHOD
Filed March 3, 1955 8 Sheets-Sheet 2

INVENTOR.
RUBEN O. PETERSON
BY
Oberlin & Limbach
ATTORNEYS.

June 26, 1962 R. O. PETERSON 3,040,608
RECIPROCATING SURFACE-FINISHING MECHANISM AND METHOD
Filed March 3, 1955 8 Sheets-Sheet 3

INVENTOR.
RUBEN O. PETERSON
BY
Oberlin + Limbach
ATTORNEYS.

June 26, 1962 R. O. PETERSON 3,040,608
RECIPROCATING SURFACE-FINISHING MECHANISM AND METHOD
Filed March 3, 1955 8 Sheets-Sheet 4

INVENTOR.
RUBEN O. PETERSON
BY
Oberlin T Limbach
ATTORNEYS.

INVENTOR.
RUBEN O. PETERSON
BY
Oberlin & Limbach
ATTORNEYS.

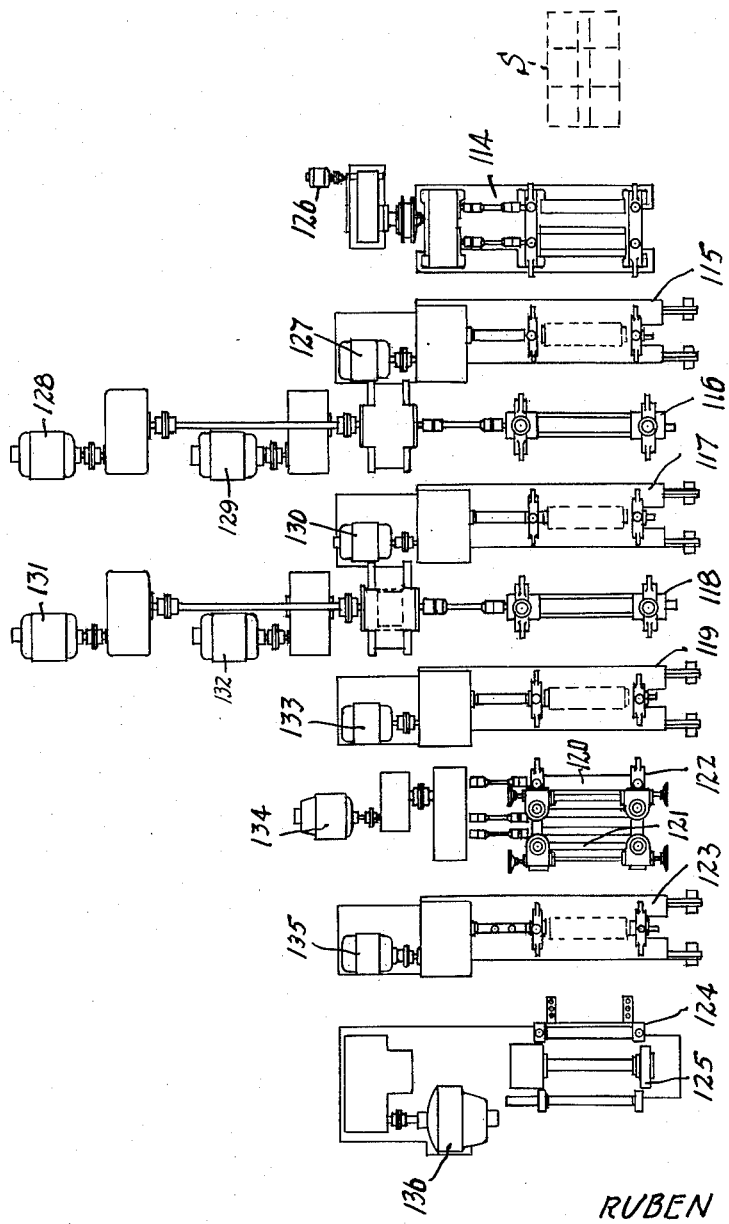

June 26, 1962
R. O. PETERSON
3,040,608
RECIPROCATING SURFACE-FINISHING MECHANISM AND METHOD
Filed March 3, 1955
8 Sheets-Sheet 7
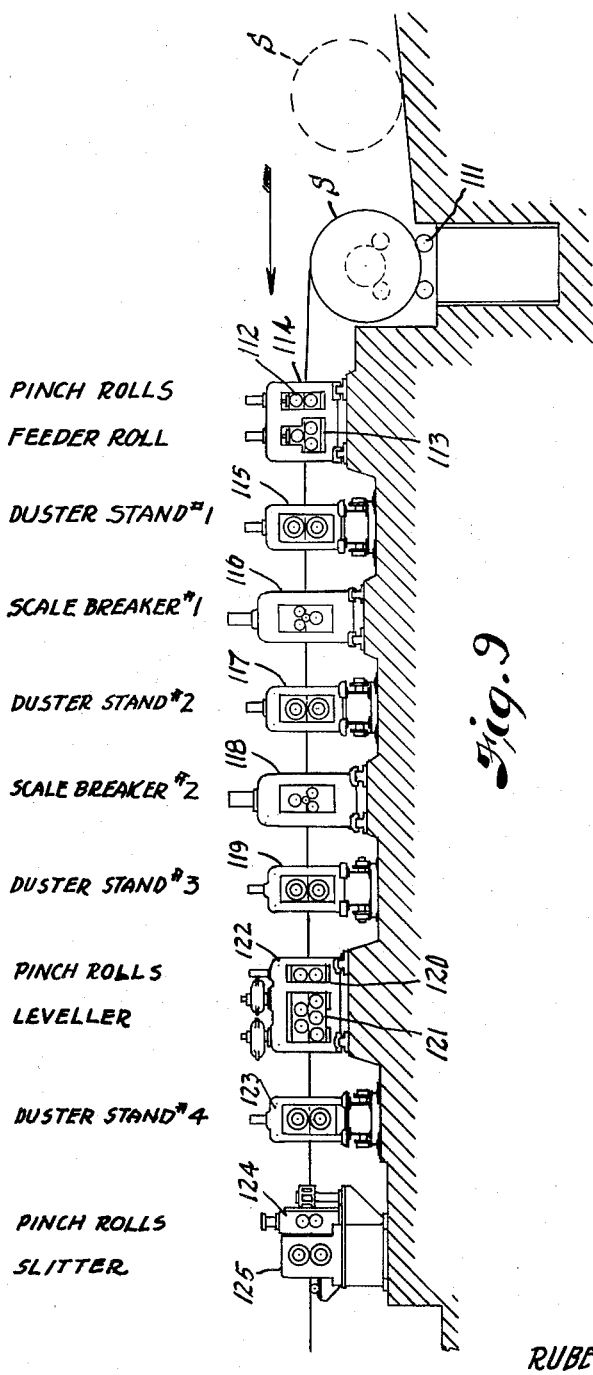
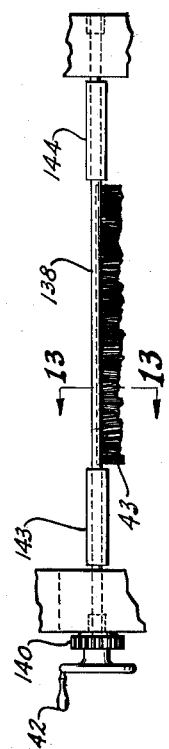
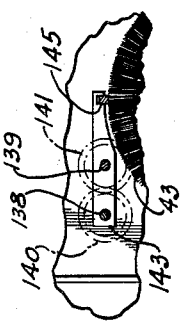
INVENTOR.
RUBEN O. PETERSON
BY
Oberlin & Limbach
ATTORNEYS.

June 26, 1962    R. O. PETERSON    3,040,608
RECIPROCATING SURFACE-FINISHING MECHANISM AND METHOD
Filed March 3, 1955    8 Sheets-Sheet 8
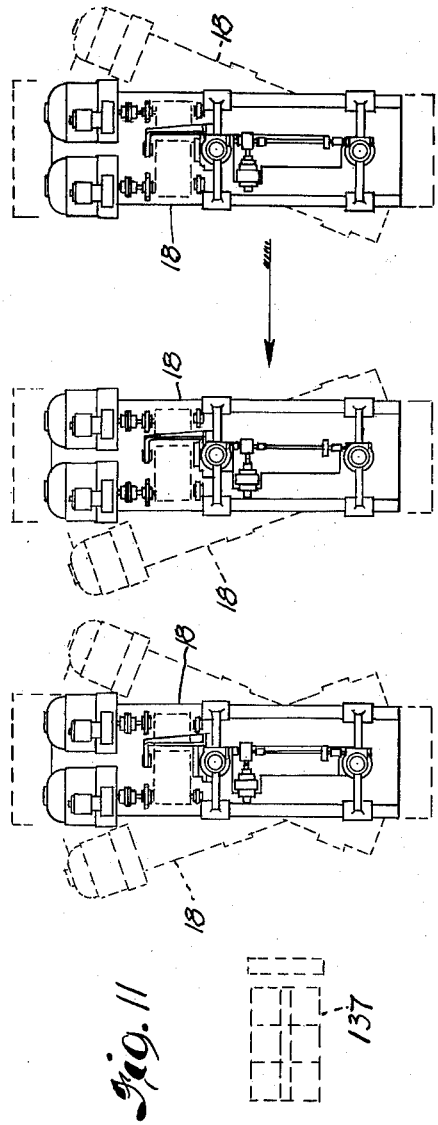
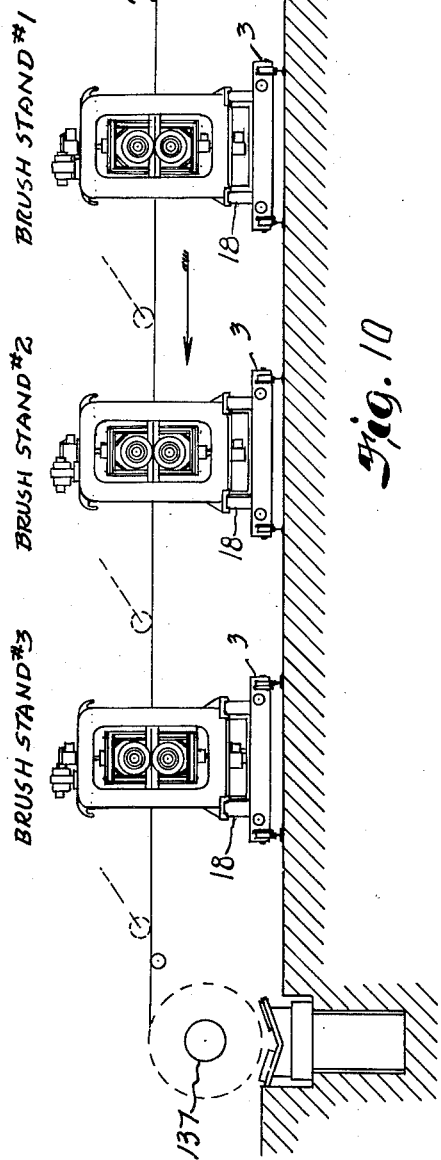
INVENTOR.
RUBEN O. PETERSON
BY
Oberlin & Limbach
ATTORNEYS.

United States Patent Office 3,040,608
Patented June 26, 1962

3,040,608
RECIPROCATING SURFACE-FINISHING
MECHANISM AND METHOD
Ruben O. Peterson, University Heights, Ohio, assignor to
The Osborn Manufacturing Company, Cleveland, Ohio,
a corporation of Ohio
Filed Mar. 3, 1955, Ser. No. 491,992
11 Claims. (Cl. 83—168)

This invention relates as indicated to a reciprocating surface-finishing and cleaning mechanism and method, and more particularly to mechanism utilizing power driven rotary brushes also mounted for reciprocation in a particular manner.

In the surface conditioning and cleaning of metal articles, and particularly elongated articles such as strip metal, rod and wire, rotary brushes have been utilized to a rather limited extent for the removal of mill scale from hot rolled stock and also to produce a desired finish on the work. Acid pickling is generally relied upon for complete removal of scale, however, although sand and shot-blasting and hot hydride methods have been employed to some extent.

Acid pickling methods are quite effective in removal of oxide scale, but they also involve the removal of some good metal unless so inhibited as greatly to slow the operation and do not assist in reducing slivers, burrs, and other surface irregularities. The pickling acids preferentially attack certain portions of the metal surface, thus producing numerous weakening and otherwise objectionable pits, and hydrogen liberated as the acid does its work is adsorbed into the steel or other metal to a considerable extent with some resultant embrittlement of the of the metal. Despite subsequent washing operations, minute amounts of the pickling solution or resultant salts and other water-borne materials, after drying, tend to remain in such small pits and surface irregularities where they may subsequently cause considerable trouble. Sulphuric acid is the acid most usually employed, and the supply is not always as stable as might be desired.

Of course, the pickling operation does not entirely use up the acids supplied to the pickling tank, and frequently more than half the acid must in due course be discarded. Disposition of the partially spent solutions containing mixtures of acids and metal salts is both a troublesome and a costly problem. Increasingly severe pollution control laws are making such problem even more severe.

When scale articles are removed by a brushing operation, on the other hand, they may be employed as an abrasive in further treatment of the work, or they may be reduced as with hydrogen to provide a metal powder suitable for employment in the rapidly growing powder metallurgy industry. Thus, the employment of brushes for scale removal serves to convert what would otherwise be a discarded waste material into a valuable by-product capable of supporting a large part of the cost of the operation. The employment of power driven rotary brushes for scale removal also has the advantage of greatly reducing the floor space required in contrast to the conventional pickling tanks. Moreover, the brushing operation, if properly performed, removes surface slivers and burrs and also blends the sharp edges around various minute surface irregularities which otherwise, after the usual rolling operations, are the cause of serious defects. A dry brushed metal surface tends to remain bright and clean for a considerable time thereafter whereas a pickled surface, even after careful drying, will proceed to rust immediately in the usual industrial atmosphere. In a typical operation where my new brushing mechanism may desirably be employed, a coil of hot rolled strip may first be placed on an uncoiler, and the end of the strip payed off by the uncoiler is fed into a three-roll leveler and feeding device effective to remove the major portion of the curvature inherent in previously coiled strip. The strip may next pass through a duster brush assembly designed to remove grit and dirt adhering loosely to the work surface. After passage through a scale breaker and between another pair of dusting brushes, the strip may continue into a roller leveler and then into a slitter adjusted to trim or divide the strip into widths desired for subsequent rolling operations. After performance of such slitting operation, the strip will continue on to certain brushing stands designed in accordance with the present invention to brush the strip surfaces, and the brushed strip will then pass to a coiling device. A line of this nature may, for example, be about 100 feet long, this being less than half the length of a line effective to produce comparable results by standard methods.

In thus performing power brushing operations on rapidly traveling elongated work such as steel strip and the like, it is, of course, important that the entire surface of the work be properly contacted and uniformly brushed. One serious difficulty encountered in the past has been the tendency of the brush face to become grooved through contact with the work, with resultant uneven effect upon a subsequent work-piece which may be of different width. Moreover, despite employment of appropriate guide means, rapidly traveling strip does not "track" perfectly, and there will be a certain amount of side-to-side oscillation.

The usual rotary brush as employed in the past has not brushed the side edge portions of the strip very adequately and if the brush is longer than the width of the strip then a groove will be worn in the brush face as above explained. Nor is it practicable to make the brush of a length exactly equal to the width of the strip since, as likewise pointed out, strips of different widths may require to be processed and, moreover, such strips do not track perfectly but wander somewhat from a straight line. Additionally, the brush bristles at the extreme ends of the brush are relatively unsupported by adjacent brush material and accordingly do not afford the same brushing action as the bristles somewhat further in from the ends.

It is accordingly a principal object of my invention to provide novel brushing mechanism for brushing traveling metal strip and other surfaces which will perform an effective and uniform brushing operation over a considerable period of time without replacement of the brushes or regrinding of the brush faces.

Another object is to provide means for reciprocating a cylindrical power driven rotary brush generally axially and in directions having major directional components lengthwise of the rotational axis of the brush in a manner to ensure uniform brushing effect and wear of the working face of the brush and proper brushing of the extreme side edge portions of the work.

A further object is to provide such reciprocation in a manner to avoid any substantial crosswise scrubbing action on the work.

Still another object is to provide a method of treating continuously traveling work such as metal strip and the like wherein a power driven rotary brush is reciprocated generally axially transversely of the traveling work with such brush always engaging the entire width of the work and each such reciprocation terminating when the end of the brush closely approaches the corresponding side edge of the work.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 8 is a diagrammatic top plan view of a line for the processing of strip from uncoiler to slitter;

FIG. 9 is a side elevation of such line;

FIG. 10 is a side elevation of a continuation of such line including a plurality of my new brushing mechanisms and a take-up for the treated strip;

FIG. 11 is a top plan of such portion of the line shown in FIG. 10;

FIG. 12 is a detail view of novel brush wear equalizing means; and

FIG. 13 is a transverse section taken on the line 13—13 on FIG. 12.

Figure 1:
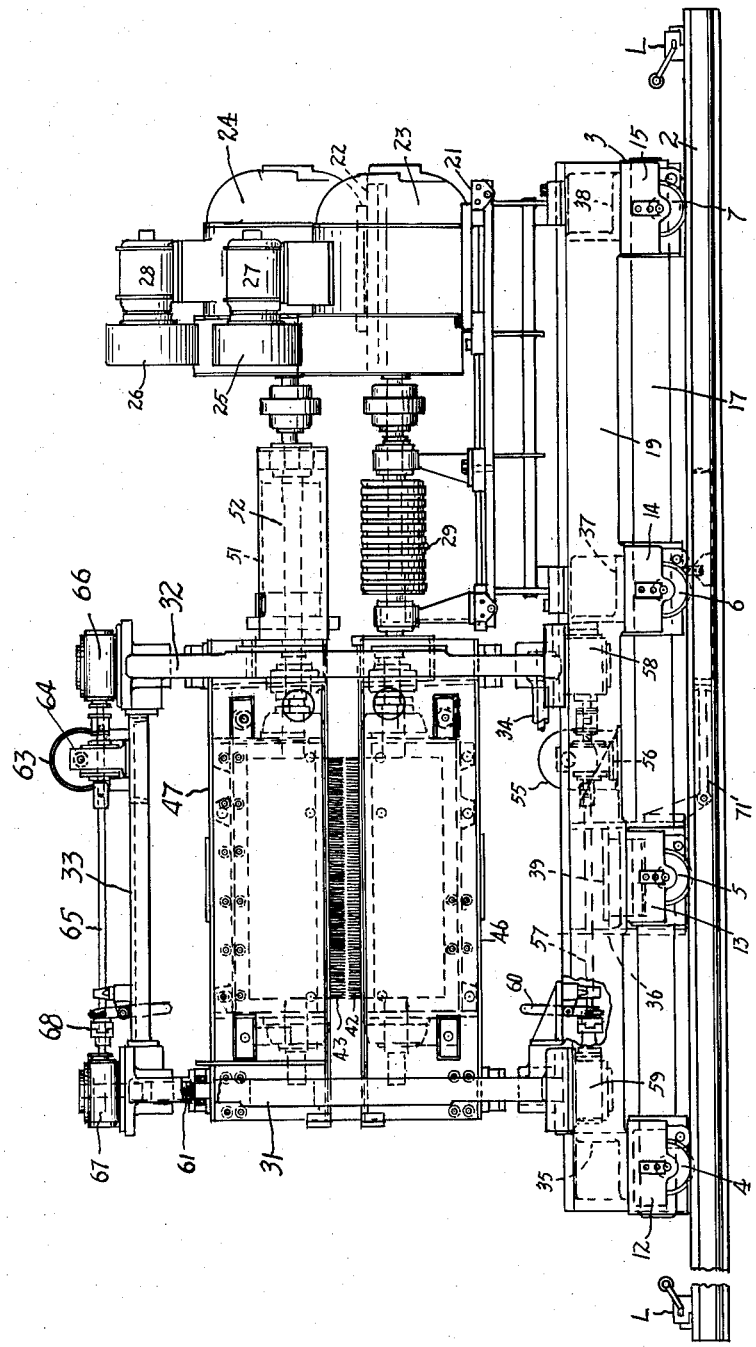
FIG. 1 is a front elevational view of a double brush assembly adapted to brush opposite sides of a traveling steel strip or the like which may ordinarily be in horizontal position, together with means for reciprocating such brushes transversely of the work.
Figure 2:
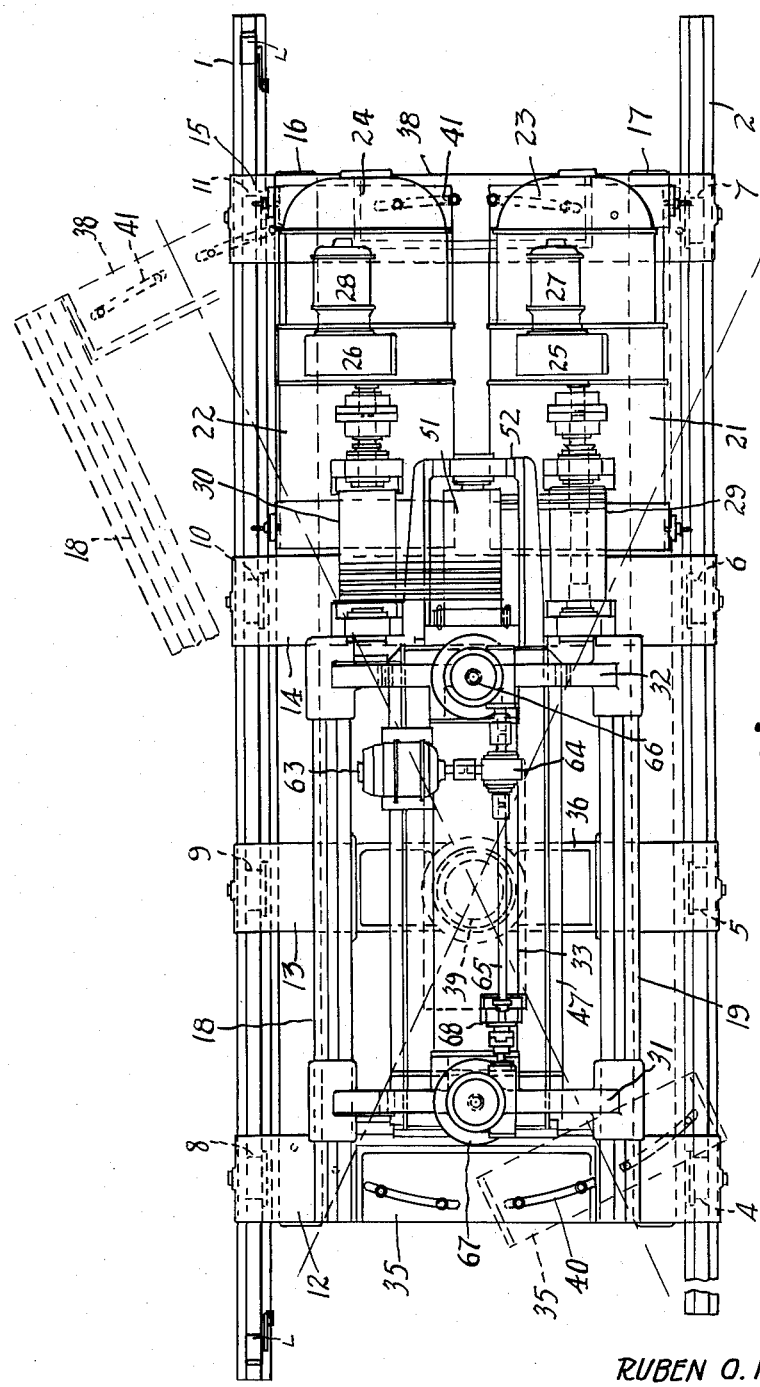
FIG. 2 is a top plan view of the brushing mechanism of FIG. 1.

Not only in a scale removal line but also in most metal strip handling lines, various operations are performed which are likely to injure the surfaces of the work if the latter have not been properly prepared. Thus, for example, a shearing operation requires that the strip pass between pinch rolls which will press into the surface of the work any dirt which may be carried thereon. This is likewise true in any rolling operation. If a strip is to be fed into presses for blanking or pressing, either the feeding rolls or the press dies will similarly drive any dirt on the strip into the surface and consequently impair the surface of the finished article. Simple wiping operations are ordinarily ineffective to clean the work surfaces adequately, but proper power brushing will usually be very effective in obtaining the desired result. After strip washing operations, the work must ordinarily be dried, and highspeed power driven brushes may likewise be employed during such drying stage. In addition to performing cleaning operations, power driven rotary brush units may desirably be employed to remove slivers and burrs and to impart a desired surface finish.

Now referring more particularly to FIGS. 1–5 inclusive of the drawing, the embodiment of my invention there illustrated comprises a pair of rails 1 and 2 on which a carriage 3 is supported for reciprocation on wheels 4, 5, 6, 7, 8, 9, 10 and 11. Such carriage comprises four cross-members 12, 13, 14 and 15, each mounted on a pair of such wheels, with such cross-members being interconnected by longitudinally extending bars 16 and 17. Longitudinally extending slideways 18 and 19 mounted on such carriage support both the brushing unit and power drive unit for adjustable positioning therealong.

Such power drive unit comprises a double decked support 20 carrying platforms 21 and 22 on which are mounted reversible motors 23 and 24 respectively. The platforms are adjustable to tighten the belt drives described below. Fans 25 and 26 for ventilating the motors are driven by smaller (e.g. 3 H.P.) electric motors 27 and 28. Motor 23 is coupled to multiple belt drive pulley 29 and motor 24 to pulley 30.

The brushing unit comprises a frame formed of two open rectangular end members 31 and 32 mounted on ways 18 and 19 and connected by a headpiece 33. Their lower ends are connected by tension rods and spacer sleeves 34 (shown partly broken away in FIG. 1). The ways 18 and 19 are joined into a single frame by means of cross-pieces 35, 36, 37 and 38 and a large vertical king-pin pivot 39 is provided for cross-piece 36 on cross-member 13 so that the brushing unit and associated power drive means mounted on such ways may be swung at a desired angle to the track 1, 2, and carriage 3. Endmost cross-pieces 35 and 38 are provided with a plurality of slots 40 and 41 arranged in arcs about pivot 39 and aligned with bolt holes in endmost cross-members 12 and 15 so that the brushing unit may be secured in selected angularly adjusted position.

A pair of opposed roller brushes 42 and 43 are journalled in inner housings 44 and 45 respectively, which housings are supported for axial withdrawal from U-shape outer housings 46 and 47 provided with slides such as 48 and 49 engaging the vertically extending portions of end frame members 31 and 32. These brush and housing assemblies may desirably be of the general type shown and described more in detail in my co-pending application Serial No. 351,367, filed April 27, 1953, now Patent No. 2,800,677. Driven pulley 50 is carried by an outrigger support extending from the inner end of housing 46 and driven pulley 51 is carried by a similar outrigger support 52 extending from the inner end of housing 47.

The ends of housing 46 are supported by vertical screws 53 and 54 threadedly engaging the same and adapted to be driven in unison through motor 55, worm gear reduction unit 56, shaft 57, and worm gear units 58 and 59. A clutch 60 is provided whereby unit 59 may be disengaged to permit individual drive for correction of axial canting of the brush.

The ends of upper housing 47 are similarly supported (in inverted position) by vertical screws 61 and 62 threadedly engaging the same and adapted to be driven in unison through motor 63, worm gear reduction unit 64, shaft 65, and worm gear units 66 and 67. A clutch 68 permits gear unit 67 to be disengaged when desired. By means of such screw drive means the brush housings, and therefore the brushes, may be moved toward and away from each other as may be required.

Figure 3:
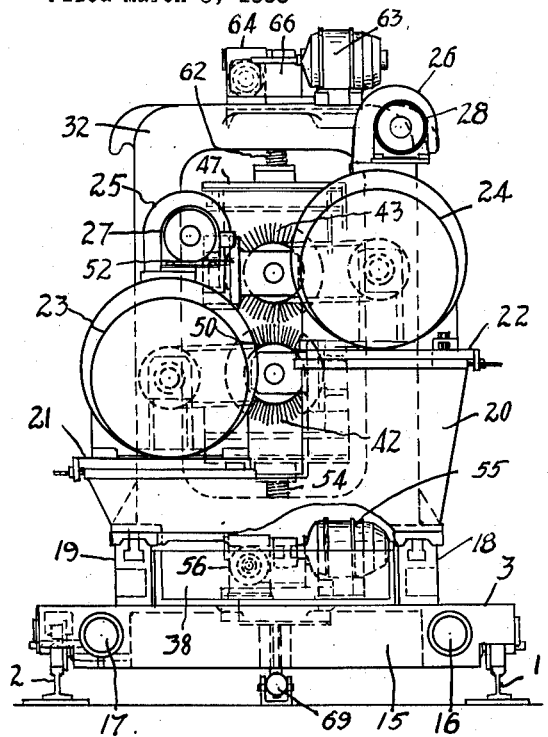
FIG. 3 is an end elevational view of such mechanism viewed from the right on FIG. 1.
Figure 4:
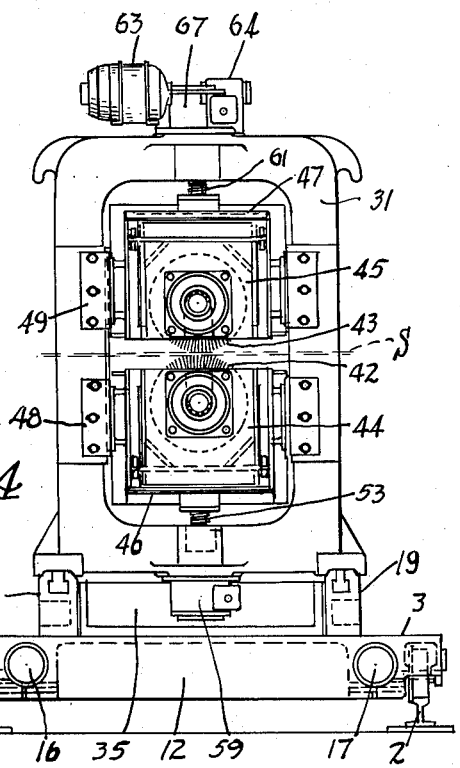
FIG. 4 is an end elevational view of such mechanism viewed from the left on FIG. 1.
Figure 5A:
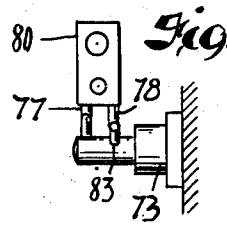
FIG. 5a is a fragmentary detail view of the valve operating means of FIG. 5.
Figure 5:
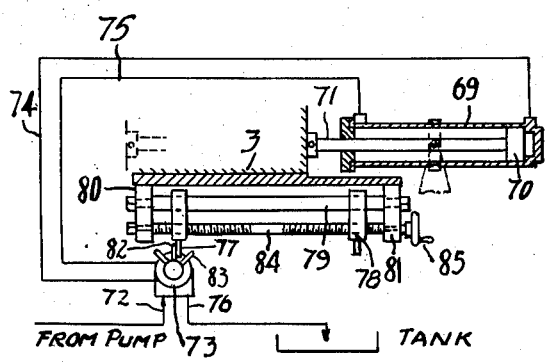
FIG. 5 is a fluid pressure diagram illustrating one form of reciprocation control means.

Now referring more particularly to FIGS. 3, 5 and 5a of the drawing, means is provided for adjustably reciprocating carriage 3 back and forth on tracks 1 and 2 comprising a hydraulic cylinder 69 mounted on a rigid base intermediate and parallel to rails 1 and 2 and having a piston 70 reciprocable therein, the rod 71 of which is connected to cross-member 13 of carriage 3. A fluid pressure line 72 from a pump (not shown) is connected through a rotary dog-operated four-way valve 73 to line 74 which leads to the piston end of cylinder 69. Another line 75 leads from such valve to the rod end of cylinder 69 and is adapted through operation of such valve to be connected with line 72 alternately with line 74, the line not thus connected being placed in communication with line 76 to tank. A pair of spaced dogs 77 and 78 are slidably mounted on rods 79 carried by brackets 80 and 81 adapted respectively to engage angularly related valve operating lugs 82 and 83 to rotate the valve. Dogs 77 and 78 also threadedly engage oppositely threaded portions of screw 84 rotatably journalled in such brackets 80 and 81 and adapted to be turned by hand wheel 85 to shift dogs 77 and 78 equally toward and away from each other in the line of travel of reciprocating carriage 3. It will thus be seen that as such carriage is reciprocated through action of hydraulic piston-cylinder assembly 70, 69, the valve 73 will be periodically reversed to change the direction of reciprocation of piston 70 and likewise of the carriage, the extent of reciprocation of carriage 3 along rails 1 and 2 being controlled by the pre-set spacing of dogs 77 and 78. Various alternative control means will occur to those skilled in the art and limit switches L are shown in FIG. 1 which may be adjustably positioned along the track to regulate the reciprocation of the carriage by energization of appropriate solenoid valve means (not shown).

Figure 6:
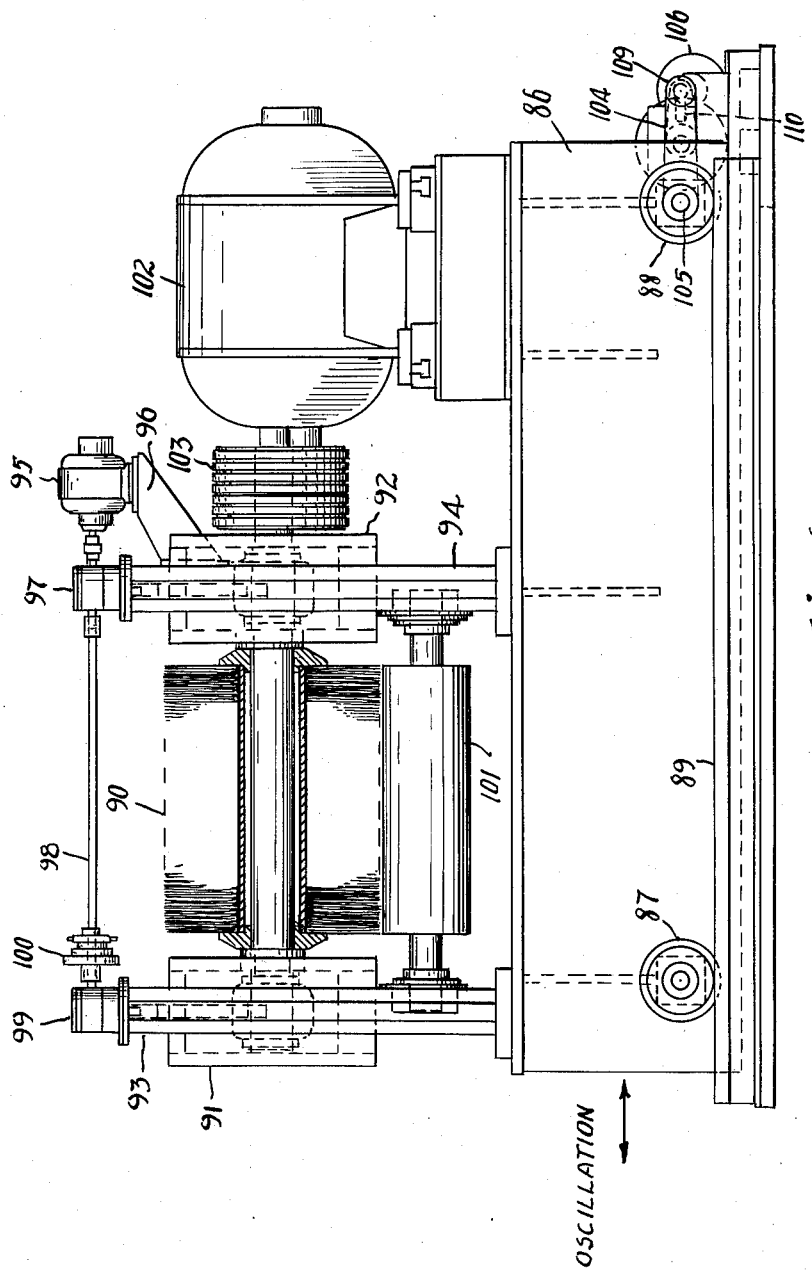
FIG. 6 is a front elevational view of another form of brushing mechanism mounted for oscillation in accordance with my invention.
Figure 7:
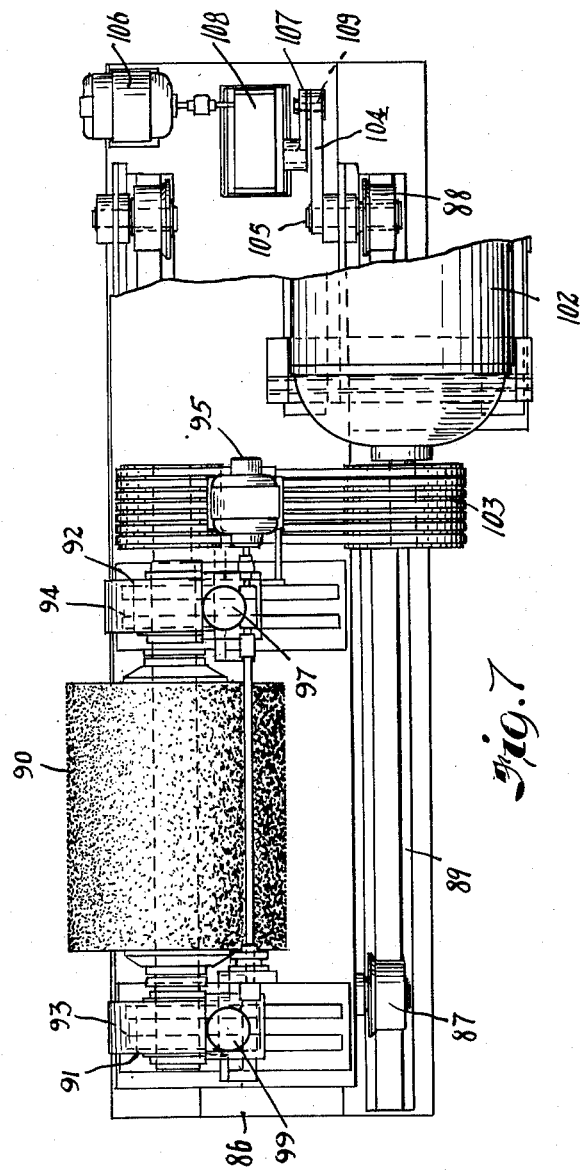
FIG. 7 is a top plan view of the mechanism of FIG. 6.

Referring now more particularly to the embodiment illustrated in FIGS. 6 and 7 of the drawing, the brushing mechanism there illustrated comprises a box frame carriage 86 supported by wheels such as 87 and 88 on rails such as 89 for reciprocation therealong. A rotary brush 90 is journalled in slides 91 and 92 vertically adjustable in end stands 93 and 94 carried by base 86. An electric motor 95 mounted on bracket 96 on stand 94 is operative through gear unit 97 to drive vertical screw means adjustably to raise and lower slide 92 similarly to such means described in connection with the FIGS. 1-4 embodiment. A shaft 98 connects such gear unit 97 with a similar gear unit 99 mounted on stand 93 to raise and lower slide 91, a clutch 100 being interposed to permit independent operation of gear unit 97 when desired.

A back-up roll 101 is freely rotatably carried in horizontally adjustable journals in the lower portions of stands 93 and 94. Brush 90 is driven by electric motor 102 through belt drive 103.

An alternative means for reciprocating the carriage axially of brush 90 is provided in the form of a link 104 pivotally connected to axle 105 on which wheel 88 (FIG. 7) is mounted. An electric motor 106 is adapted to drive a crank 107 through gear reduction unit 108, such crank having a pin 109 at its end pivotally engaged in a bushing adjustably secured in slot 110 in the outer end portion of rocker arm 104. As crank 107 reovlves, link 104 is accordingly reciprocated first in one direction and then in the other with consequent reciprocation of carriage 86 along the trackway. Pin 109 is adapted to be adjustably positioned longitudinally of crank 107 correspondingly to regulate the extent of such reciprocation.

Referring now to FIGS. 8 and 9 of the drawing which show a metal strip brushing line in diagrammatic top plan view and side elevation respectively, a coil of metal strip S is adapted to be rolled upon uncoiler 111 and the leading end of the strip first threaded between pinch rolls 112 and then feeder rolls 113 in stand 114 whence it passes between opposed brushes of a duster stand 115 adapted preliminarily to clean both surfaces of the strip of loose particles of dirt and grit. The strip then passes successively between the rolls of scale breaker 116, between the brushes of a second duster stand 117, between the rolls of a second scale breaker 118, between the brushes of a third duster stand 119, between pinch rolls 120 and leveler rolls 121 in combination stand 122, between the brushes of a fourth duster stand 123, between pinch rolls of pinch roll stand 124 and then through a slitter 125. As shown in diagrammatic plan view FIG. 8, these several units are powered through motors 126, 127, 128, 129, 130, 131, 132, 133, 134, 135 and 136 respectively. Except for the duster stands (brushing units), these units may be of conventional construction and design effective to accomplish the desired function.

As indicated, the brushing units will be mounted on rails for reciprocation transversely of the path of travel of the strip being treated. The brushes utilized will be at least slightly longer than the width of the widest strip to be handled by the line, and the reciprocation of the brush supporting carriages will be regulated to cause the ends of each brush closely to approach the corresponding side edges of the strip being brushed at the inner limits of such reciprocation. The placement of a brush transversely of the traveling strip may or may not be at the same angle as rails or other guide means guiding the reciprocation of the brush transversely of the strip. Such rails may be closely associated with the brush housing or more usually with the entire brush stand, as shown.

Now referring to FIGS. 10 and 11 of the drawing, there is illustrated a portion of a strip treating line utilizing a plurality of brushing units which may be of the type shown in FIGS. 1-4 inclusive (brushing units of this type may also be employed in the FIGS. 8 and 9 line) and illustrating the manner in which the brushes may be swiveled about the vertical pivots 39 (FIGS. 1 and 2) so that the respective brushes are disposed at an angle to the path of travel of the strip S to coiler 137. Thus, the brush unit of brush stand No. 1 of FIGS. 10 and 11 may be swiveled as shown in FIG. 11 and the brush unit of brush stand 2 swiveled an equal amount in the opposite direction, it being understood that each of these stands is capable of being swiveled in either direction as may be desired. Other brush stands in the line will also preferably be similarly mounted. If the brush unit of brush stand 3 is then left with the axes of the brushes directly parallel to the path of reciprocation of the supporting carriage, it will be seen that the surfaces of the metal strip passing successively through these three stands will be brushed in three different angularly related directions. It has been found that by thus brushing the metal surface in a plurality of different directions, and preferably in at least three such different directions, a very superior action is obtained both in the removal of scale and slivers and the blending of pits and scratches as well as producing a superior finish on the surface and at the edges. The diagonal placement of the power driven rotary brushes is especially helpful and effective in removing edge burrs produced by a slitting operation and also in blending the sharp surface junctures at such edges to form desirably rounded corners. The brushes will, of course, be driven at high speeds of rotation, which may be on the order of about 6,000 or even 9,000 surface feet per minute, for example, whereas the reciprocation of the brush supporting carriages transversely of the path of travel of the strip is so slow as to be wholly inconsequential insofar as any modification of the brushing action is concerned. Such reciprocation may, for example, be at the rate of only three complete return reciprocations per minute although such reciprocation may also be at a somewhat greater rate if desired, without appreciably affecting the action of the brush bristles upon the work.

As previously indicated, the axial length of the brush will be substantially greater than the width of the work, e.g. steel strip, being brushed thereby, and the brush when skewed at an angle to the path of travel of the work, will have an effective length substantially greater than the width of such strip. The reciprocation of the brush supporting carriage is adjusted so that at the end of each stroke the endmost bristles of each end of the brush will closely approach the corresponding side edge of the strip but will not be moved to a point spaced inwardly of such strip edge so that a portion of the strip surface is not brushed at all. It will be apparent that the central portion of the brush face will always be operating on the work whereas the endmost portions of the brush face will at times be reciprocated laterally of the work and will thus not be subjected to as much wear. This may eventually result in some degree of center grooving of the brush although at not nearly so rapid a rate as would occur were the brush not reciprocated in the manner described. Such tendency toward center grooving is, moreover, largely counterbalanced by the fact that the endmost portions of the brush which periodically project laterally of the work are reciprocated across the usually rather sharp burred edges of the work and are thus subjected to more rapid wear than would otherwise be the case.

By skewing the brush at an angle to the path of travel of the work, ordinarily at an angle of from about 10 to 45 degrees from a normal transverse position, not only is the improved surface brushing action obtained as explained above, but also the portions of the reciprocating brush which periodically extend beyond the respective side edges of the work are caused to engage such side edges themselves at an angle to afford a much superior brushing action thereon. It is indeed an important advantage of my invention as contrasted to known prior art methods that the extreme edges of the work are suitably prepared and beneficiated so that subsequent special trimming and finishing operations are unnecessary. It will be noted that the carriages supporting the brushes will ordinarily be mounted for reciprocation directly tranversely of the path of travel of the work (i.e. at right angles thereto) so that when the brushes are skewed at an angle to such path, they are also disposed at an angle to the path of reciprocation of such carriage. It is, of course, possible to arrange the brush carriage for reciprocation at the same angle to the path of travel of the work as that at which the brush is disposed, but it will normally be preferred that all such carriages be mounted for reciprocation at right angles to the path of work travel.

By adjusting the length of reciprocation of the brush carriage, a wide range of work-piece widths may be accommodated, the maximum width of the work-piece being appreciably less than the length of the brush or the effective length of the latter if the brush is skewed. It is not only a great economy thus to be able to brush a variety of different work-pieces without the necessity of changing the brushes employed, but it is also a more economical operation even when a single width of work-piece is always acted upon. This is for the reason that a considerably larger brush (i.e. of greater length than the strip is wide) is utilized and the wear in use is spread over a larger body of brush material. The brush accordingly will last considerably longer.

The employment of a sufficiently long brush and the operation of the same so that it always extends at least slightly beyond the sides of the work further serves to accommodate a work-piece such as a steel strip which does not track perfectly. The entire surface of such strip will always be adequately and uniformly brushed.

As a result of my invention, it is relatively seldom that the line need be stopped to allow for removal and replacement of a brush, and such down time may be further lessened by the provision of hard tool bits or abrading stones mounted on the brush stands or on appropriate stationary supports occasionally to engage and dress the work faces of the rapidly rotating brushes, and especially the end portions of such faces which are in contact with the work for a less period of time than are the central portions. When such brush dressing means is carried by an adjacent support, the brush may be reciprocated parallel thereto and then it is not necessary to reciprocate the abrading means itself. A suitable stationary wear surface may also be provided disposed continuously to engage the respective end portions of the brush not continuously contacting the work to equalize the wear on such brush end portions.

Various types of brush drive means may be utilized, including fluid motors, and it will be desirable periodically to reverse the direction of rotation of the brushes to maintain the sharpness of the bristle ends. The brush bristle material employed will ordinarily be relatively hard crimped steel wire which may, for example, have a thin coating of nylon or other plastic thereon, and unless extremely hard wire is employed the bristle ends tend to become rounded and dulled on the sides first engaging the work, considerably reducing their effectiveness. This difficulty may be substantially avoided by periodically reversing the direction of rotation of the brushes, and for this reason the drive means may desirably be reversible electric motors or fluid motors as above indicated. If a sufficient number of brushing stands are utilized, the brushes of one stand at a time may be temporarily retracted out of contact with the work in order that they may be stopped and their direction of rotation thus reversed. Also, the brushes of an extra stand which have last been driven in one direction and have since been retracted from contact with the work may now be brought into operation again in the opposite direction to replace brushes of another stand due to be retracted and reversed, the newly retracted brushes becoming extras for similar subsequent employment. In some cases, however, it is quite satisfactory thus to reverse the rotation of the brushes while still in contact with the work or with contact pressure slightly reduced inasmuch as this can be achieved in a very short period of time. It is also often feasible to time such brush reversal in synchronism with changes in speed of travel of the work and the passage of strip ends, for example.

As shown in my Patent No. 2,680,938, for example, the rotary brushes themselves may be provided with an internal feed for fluids and abrasives which may thus be delivered to the work surface from the interior of the brush by the action of centrifugal force. When such means are employed, it will also ordinarily be desirable to provide adjacent suction hoods to carry away the abrasive particles after they have served their purpose as well as the particles of dirt and other material removed from the work-piece.

In view of the superior edge finishing action obtained in accordance with my invention, it will sometimes be desirable to slit the metal strip being acted upon prior to the performance of the final brushing operations thereon. Ordinarily, the slitter will be placed in the line at a position subsequent to the scale breaking station, but prior to the final surface beneficiating and finishing brushing stations. The resultant relatively narrow strips will be somewhat spaced apart and conducted in parallel through such latter brushing stations to be acted upon simultaneously by the brushes in the same manner as a unitary strip, but it will be apparent that the individual edges of the narrow strips will now be brushed and finished, particularly when the brushes are skewed relative to the path of travel thereof as will ordinarily be desired.

The apparatus and method described above have numerous advantages over conventional pickling methods ordinarily employed in the removal of scale from strip and the like including the fact that there is little or no loss of virgin metal by a brushing as compared with from about ½% to as much as 2% metal loss often experienced during pickling. A brushing line of the general type illustrated and described will ordinarily occupy somewhat less than one-half the space required by a pickling line. The pickling acid fumes are highly corrosive in the building and associated equipment and also make for unhealthful working conditions. Whereas the brushing line may be continuously maintained with only very brief periods of down time, a pickling line must periodically be completely shut down for relatively long periods to permit substantial replacements and repairs. The cost of the pickling acids, commonly sulphuric acid, has in the past fluctuated considerably more than has been the case with suitable brushing materials. Not only is the supply of sulphuric acid sometimes a problem, but also the large quantities of water necessary are becoming steadily more difficult to obtain, especially reasonably clean water which will not leave objectionable residues. Whereas the waste disposal problem of a pickling line is serious and becoming steadily more so due to the imposition of antipollution laws, the scale removed by a brushing line is easily salvaged and becomes a valuable source of powdered metal for use in powder metallurgy. It is also useful as an abrasive and as a chemical. The installation cost of a scale removal line of the general type disclosed herein may be as low as approximately one-third that of a continuous pickling line having the same production capacity.

Not only are there very important operating advantages arising from the employment of my new apparatus and process, but also the finished work is much superior to that obtainable from a conventional pickling line. More particularly, the brushing action, properly controlled, serves to beneficiate the metal surface by removal of minute splinters, the blending of sharp edges of pits, other surface irregularities and strip margins, and the production of a very clean, dry finish which does not tend to rust quickly. Despite the washing steps employed after acid pickling, it is not practical to remove all minute traces of acid, salts and water-borne dirt from the metal surface, and consequently the pickled surface is not clean and is highly susceptible to rusting. The pickling process actually tends to produce and accentuate objectionable pits in the surface in which salts collect and a certain amount of hydrogen may be absorbed by the metal surface with consequent local weaknesses and embrittlement.

The brushing stands fit in well with other high speed equipment such as slitters, for example, and the brushing operations may, of course, be selected not only to remove scale but also to afford an improved finish to the metal surface, to remove edge burrs, and generally to eliminate the need for further elaborate finishing operations at a later period. In contrast thereto, the pickling line is often a bottle-neck in a steel mill.

It will be seen from the foregoing that while the brush may be reciprocated directly axially in accordance with my invention and at right angles to the path of travel of the strip or other work, such brush will generally be swiveled at an angle to the path of brush reciprocation, sometimes as much as 45° thereto. There will nevertheless obviously be a large axial component to such reciprocation. Thus, the brush and its support are adapted to be swiveled about an axis normal to the brush axis, and the brush is adapted to be reciprocated in a plane including its axis and in a generally axial direction. The brush is also mounted for reciprocation toward and away from the work along a path normal to the latter.

The cylindrical rotary brushes, often called "roller" brushes, will generally be filled with wire brush material, the gauge of wire employed affecting the surface finish obtained. The brushing pressure and the speed of operation also modify the brushing characteristics obtained. While in the past it has been the practice to employ rotary brushes made up of a number of axially assembled annular brush sections so that the length of the brush could be altered as desired by addition or removal of sections it is now feasible to utilize helically coiled brush strip which will not cause streaking of the work as sometimes occurs with annular sections. In some finishing operations it will be desirable to use fabric buff material instead of wire or like brush bristle material, often with granular abrasives in well-known manner.

In ordinary operation the brushes may be skewed diagonally of the path of travel of the work at an angle of from about 10° to 45° to a normal transverse position, and ordinarily preferably from about 20° to 35°. The amount of maximum projection of the brush ends beyond the side edges of the work may vary widely depending on the operation and especially the size of the work and brushes, and may amount to several inches or several feet.

Many types of work may be brushed in accordance with my invention including ferrous and non-ferrous strip, rod, and wire and also sheets. It will sometimes be advantageous, as when brushing spaced parallel wires, to reciprocate the brushes within the stands rather than to reciprocate the stands themselves. The rate of work travel will ordinarily be very much slower than the surface feet per minute speed of the brushes and will commonly range from about twenty to several hundred feet per minute.

Reciprocation of the brushes in the manner taught herein has a further incidental advantage in minimizing possible streaking of the work should the brush face be locally damaged in a minor way as by bumping or by accidental passage of a sizable projection or object. Brushes of relatively large diameter will ordinarily be utilized which may have a circumference of about five feet, for example, and when rotating at high speeds such as 9,000 surface feet per minute it is apparent that any one portion of the relatively slowly traveling work surface will be brushed a number of times by the entire brush periphery which is, moreover, also shifting laterally as the brush is reciprocated. In consequence, the effect produced by the defect in the brush face will be substantially obliterated and in any event will not be reproduced in a straight line tending to accentuate the same.

As above indicated, it will at times be desirable to provide supplemental means for maintaining the brush faces true, and a device for this purpose is shown in FIGS. 12 and 13. Two parallel shafts 138 and 139 are journalled for rotation in upper brush housing 45 parallel to the axis of rotation of brush 43 and intergeared by means of pinions 140 and 141 to turn in unison in opposite directions. A hand wheel 142 is provided keyed to shaft 140 thus to rotate such shafts. Two blocks 143 and 144 are mounted on the shafts for reciprocation therealong, block 143 threadedly engaging shaft 138 and block 144 similarly engaging shaft 139. As such shafts are rotated in unison in opposite directions, the blocks are shifted toward and away from each other so as to overlie an equal extent of the respective brush face end portions. The degree of overlap will be adjusted to correspond to the portions of the brush which alternately project laterally of the work as the brush is reciprocated. Each block carries an abrading member 145 which may be a hard metallic bit such as chilled white iron, tungsten carbide, or a stone, for example, mounted to engage the brush face to impose a certain amount of supplementary wear thereon for equalizing purposes. The device may be arranged to bring such abrading means to bear against the brush along an extension of the line diametrically opposite the line on the brush circumference where the latter engages the strip or other work, or it may be circumferentially positioned as desired. The abrading members may be provided with wedges or shims for adjustment toward the brush face and will be adjustable parallel to the axis of the brush as shown to ensure that they properly contact those areas of the brush face which should desirably have supplemental wear to keep the brush face substantially true. Of course, a similar device may be associated with each brush as desired.

Other modes of applying the principle of the invention may be employed, change being made as regards the details described, provided the features stated in any of the following claims or the equivalent of such be employed.

I therefore particularly point out and distinctly claim as my invention:

1. In the method of power brushing a continuously traveling metal strip with a cylindrical rotary brush extending transversely of such strip and having its axis skewed substantially relative to the path of travel of such strip, such brush projecting beyond both side edges of such strip at all times; slowly reciprocating such brush generally axially thereof and bodily directly transversely of such strip normal to the path of travel thereof, regulating the extent of such reciprocation to bring each end of such brush alternately closely adjacent the corresponding side edge of such strip but still projecting very slightly therebeyond, and driving such brush at a high speed sufficient to render the rate of travel of such strip and the rate of such reciprocation ineffective appreciably to modify the brushing action on the work.

2. Surface cleaning and beneficiating mechanism comprising a brush stand, a pair of parallel opposed cylindrical rotary brushes having horizontal axes journalled in said stand for vertical reciprocation toward and away from each other, means mounting said stand for swinging movement about a vertical axis normal to both said brush axes, and means operative to reciprocate said stand to reciprocate said brushes in horizontal planes and in directions within 45° axially thereof.

3. Brushing mechanism comprising a trackway, a frame mounted for reciprocation along said trackway, a brush stand mounted on said frame for adjustable pivotal positioning about a vertical axis, a power driven cylindrical rotary brush having radially extending brush material and having a horizontal axis journalled in said stand for vertical adjustment therein, and means operative to reciprocate said frame along said trackway.

4. Brushing mechanism comprising a trackway, a frame mounted for reciprocation along said trackway, a brush stand mounted on said frame for adjustable angular positioning relative thereto in a horizontal plane, a power driven cylindrical rotary brush having radially extending brush material and having a horizontal axis journalled in said stand, means operative to reciprocate said frame along said trackway, and means adapted adjustably to regulate the stroke of such reciprocation.

5. Brushing mechanism comprising a power driven cylindrical rotary brush having radially extending brush material, support means mounting said brush for pivotal movement about an axis transverse of the brush axis of rotation and intermediate the ends of said brush, and power means operative to shift the ends of said brush back and forth relative to the work engaged thereby.

6. Brushing mechanism comprising a power driven cylindrical rotary brush having radially extending brush material, means mounting said brush for reciprocation in a direction having a substantial axial component, a motor for driving said brush connected with said brush, means mounting said motor for reciprocation with said brush, and control means operable adjustably to limit the inward stroke of the respective brush ends.

7. In a power brushing stand, a power driven cylindrical rotary brush, means operative to reciprocate said brush in a direction including a major axial component, means adjustably limiting the stroke of such reciprocation, a pair of brush wear members adapted to engage the working face of said brush adjacent the respective ends thereof, and means operable to adjust said members toward and away from each other parallel to the axis of said brush to engage only the extent of the respective end portions of said brush face which due to such reciprocation of the brush do not continually engage the work.

8. In a power brushing stand, a power driven cylindrical rotary brush, means operative to reciprocate said brush in a plane including the axis of said brush and in a direction including a substantial axial component thereof, and spaced wear members mounted to engage respective end portions only of the rotary brush face.

9. In the method of power brushing a surface of a relatively traveling work-piece; reciprocating a power driven cylindrical rotary brush back and forth in a direction having a substantial axial component transversely of the path of travel of such work with the brush always in engagement with the full width of the latter, the effective length of such brush being greater than the width of such work, regulating the extent of such reciprocation to bring each end of such brush alternately closely adjacent the corresponding side edge of such work and then reversing the direction of reciprocation, and additionally abrading the respective end portions only of the brush face not always engaging the work to equalize the wear thereon and maintain a substantially true face.

10. Surface cleaning and beneficiating mechanism comprising a brush stand, a pair of parallel cylindrical rotary brushes journalled in said stand for reciprocation toward and away from each other, means mounting said stand for swinging movement about an axis normal to a line between the two brush axes and parallel to the latter axes, and means operative to reciprocate said stand to reciprocate said brushes simultaneously in the same directions, such directions being within 45° of the axes of said brushes.

11. Mechanism for the treatment of continuously traveling metal strip comprising a slitter operative to slit such traveling strip into a plurality of slightly spaced narrower strips, a power driven rotary brush positioned in advance of said slitter in the line operative to power brush such traveling strip prior to slitting to remove abrasive material on the surface of such strip and thereby reduce wear on the slitter, a cylindrical power driven rotary brush following said slitter in such line operative simultaneously to engage all such narrower strips, said brush being of greater length than the aggregate width of such parallel narrower strips, and means operative to reciprocate said brush parallel to the strip surfaces engaged thereby in a direction including a substantial axial component to bring the respective ends of said brush alternately closely adjacent the respective outer side edges of the outermost of such narrow strips.

References Cited in the file of this patent

UNITED STATES PATENTS

| | | |
|---|---|---|
| 1,021,302 | Connor | Mar. 26, 1912 |
| 1,097,976 | Henderson | May 26, 1914 |
| 1,135,996 | Diefenbach | Apr. 20, 1915 |
| 1,436,464 | Sundh | Nov. 21, 1922 |
| 1,578,188 | Burton | Mar. 23, 1926 |
| 1,964,174 | Raiche | June 26, 1934 |
| 2,015,583 | Bartsch | Sept. 24, 1935 |
| 2,256,520 | Johansen et al. | Sept. 23, 1941 |
| 2,279,608 | Wood | Apr. 14, 1942 |
| 2,297,976 | Nachtman | Oct. 6, 1942 |
| 2,306,620 | Futhey | Dec. 29, 1942 |
| 2,318,432 | Stanier et al. | May 4, 1943 |
| 2,391,499 | Yoder | Dec. 25, 1945 |
| 2,516,636 | Marcy | July 25, 1950 |
| 2,680,938 | Peterson | June 15, 1954 |
| 2,682,065 | Nelson | June 29, 1954 |
| 2,751,617 | McLaggan | June 26, 1956 |
| 2,759,301 | Valette | Aug. 21, 1956 |
| 2,767,413 | Herrington | Oct. 23, 1956 |

FOREIGN PATENTS

| | | |
|---|---|---|
| 38,594 | Austria | 1909 |
| 444,842 | Germany | Jan. 3, 1926 |